United States Patent [19]
Twedell

[11] 3,988,030
[45] Oct. 26, 1976

[54] SLIP-JOINT COUPLING, METHOD OF INSTALLING SAME AND FRAME SUBASSEMBLY FOR USE THEREWITH

[76] Inventor: Jack L. Twedell, 6749 S. Delaware, Littleton, Colo. 80120

[22] Filed: May 12, 1975

[21] Appl. No.: 576,565

[52] U.S. Cl. .............................. 285/183; 29/509; 285/189; 285/424
[51] Int. Cl.² .................. F16L 41/00; F16L 43/00
[58] Field of Search ................... 285/189, 183, 424; 29/509; 113/116 EE

[56] References Cited
UNITED STATES PATENTS

| | | | |
|---|---|---|---|
| 2,874,980 | 2/1959 | Browning | 285/189 |
| 2,880,017 | 3/1959 | Anderson et al. | 285/424 X |
| 2,950,131 | 8/1960 | Hennen | 285/424 X |
| 2,965,397 | 12/1960 | Vanden Berg | 285/424 X |
| 3,185,506 | 5/1965 | Szlashta | 285/424 X |

*Primary Examiner*—Thomas F. Callaghan
*Attorney, Agent, or Firm*—Edwin L. Spangler, Jr.

[57] ABSTRACT

This invention relates to a slip-joint coupling between a sheet metal duct fitting and the metal frame bordering a rectangular opening in a so-called "duct board" consisting of a fiberglass mat overlayed with a sheet of silvered paper backing adhesively attached to one face of the latter, such coupling comprising outturned flanges along both side margins and the leading edge of the fitting plus an inturned flange on the trailing edge of the latter, all of which cooperate with a three-sided frame having outwardly opening channels on each side and across one end to receive the duct board together with relatively narrower inwardly opening channels on one face for slidably receiving the outturned flanges of the fitting. With the fitting and frame in assembled relation, the inturned flange is bent down to complete the fourth side of the frame, lock the assembly within the duct opening and complete the air seal along the fourth side of the latter.

7 Claims, 10 Drawing Figures

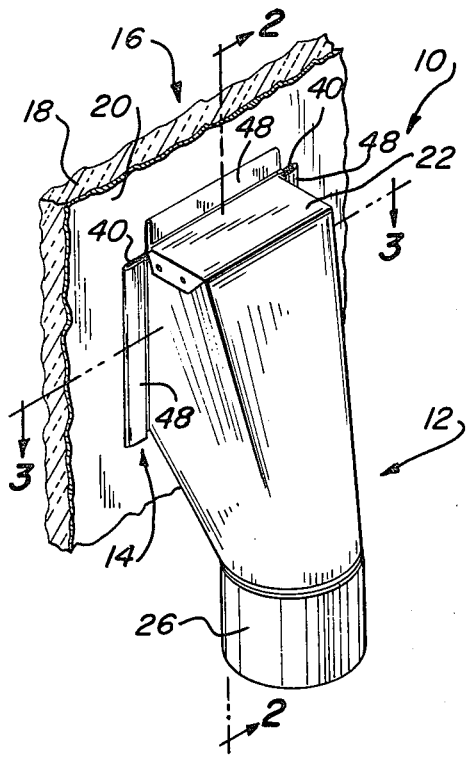
Fig_1
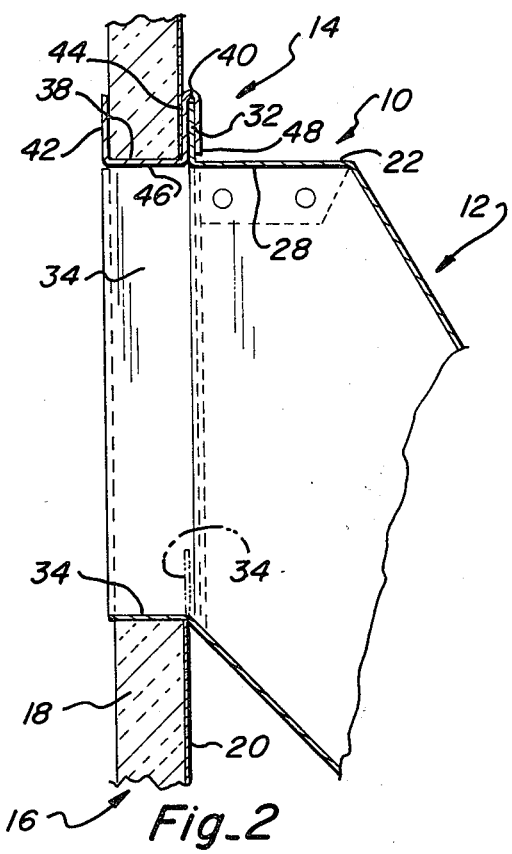
Fig_2
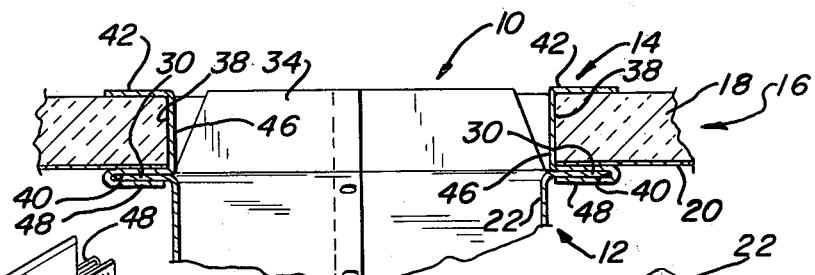
Fig_3
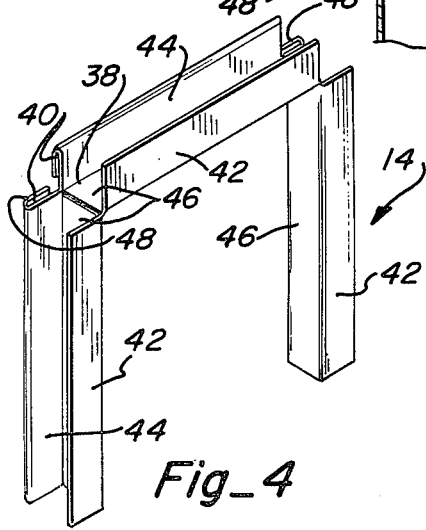
Fig_4
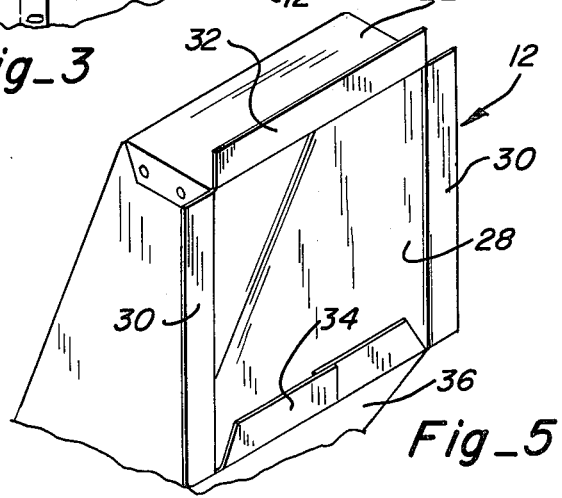
Fig_5

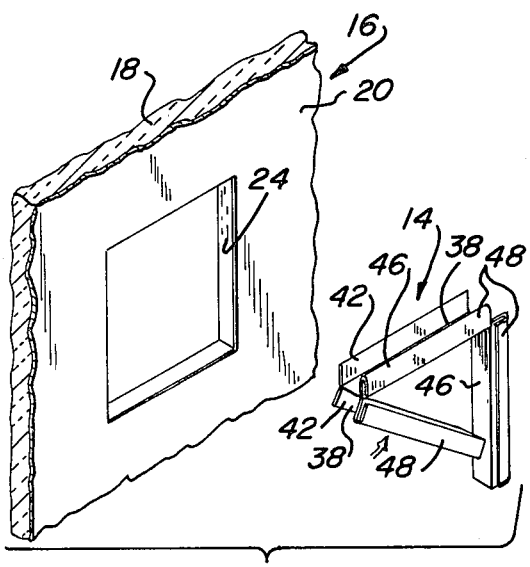
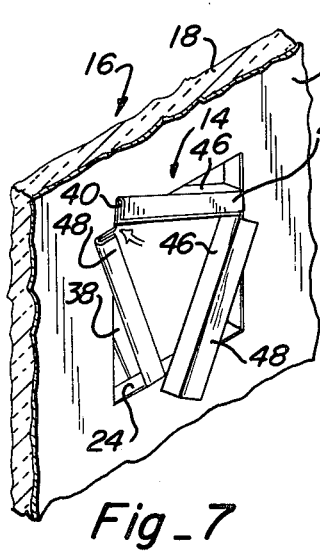
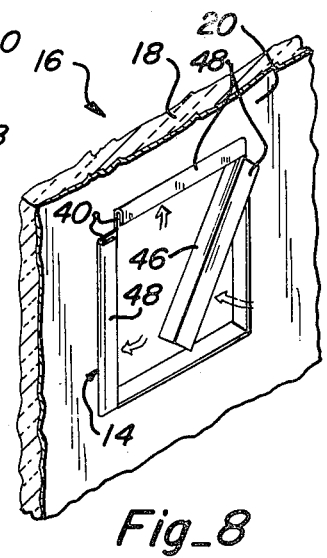
Fig_6  Fig_7  Fig_8
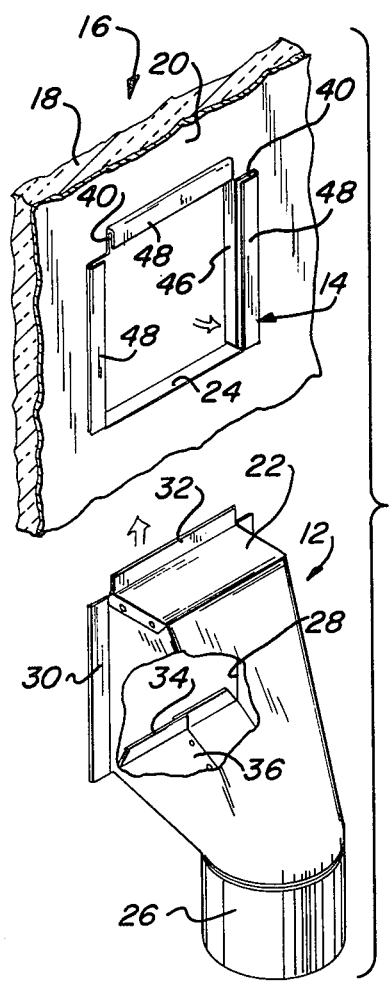
Fig_9
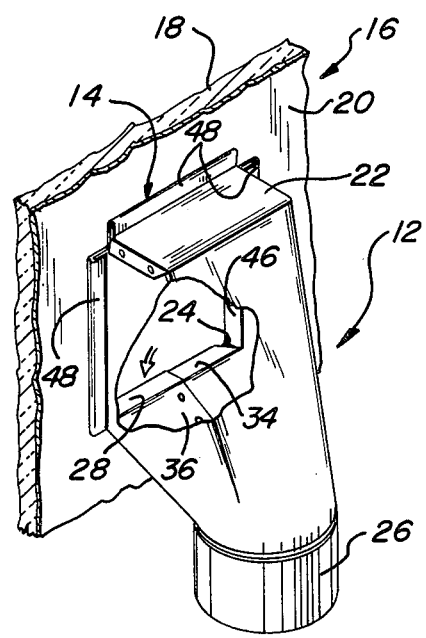
Fig_10

SLIP-JOINT COUPLING, METHOD OF INSTALLING SAME AND FRAME SUBASSEMBLY FOR USE THEREWITH

For many years, sheet metal workers have been installing so-called "take-offs" in the form of collars, elbows, reducers, etc. in openings placed in the wall of larger sheet metal ducts. Sometimes these openings are circular and sometimes rectangular or square which fact, of course, is determinative of the shape of the mating end of what, for the lack of a better term, will be denominated here as a "fitting". In other words, a square duct hole demands a square-ended fitting of appropriate size and shape, etc. The end of the fitting remote from the end that mates with the duct can, obviously, be of the same or different shape depending upon what it connects onto.

The present invention relates to that class of sheet metal fittings having square or rectangular ends adapted to mate with correspondingly shaped openings in the duct wall. Fittings for this purpose are well known in the art and one popular style is identical to that used with the novel frame of the instant invention to produce the slip-joint connection forming the subject matter hereof; however, when used with sheet metal ducting, the method of use and the resulting joint are entirely different. Specifically, the outturned tab or flange on the leading edge of the fitting is slipped underneath the remote margin of the opening in the duct while the side flanges are left outside or on top of the side margins of the opening. A connection consisting of alternating inside and outside tabs plus one folded tab is completed by reversely bending the inturned tab of the fitting in and under the adjacent margin of the duct opening. This type of connection performs quite satisfactorily when attaching fittings into square or rectangular openings in sheet metal ducts as the resulting joint is secure, reasonably air tight, fast and easy to form. The more modern heating and air conditioning methods for use in new construction, however, are eliminating the sheet metal ducting of the past and substituting therefor ducts fabricated from paper-backed fiberglass duct board panels in which the previously described joint just will not work.

In an attempt to adapt the present fittings for use with duct board, some have tried extending the leading edge tab and the inturned tab along the trailing edge of the fitting to accommodate the greater thickness of the duct board while continuing to make the connection in much the same way as before in sheet metal. The resulting joint is poor in that the flexibility and compressibility of the duct board is incompatible with the type of rigid coupling one is able to realize using this same technique in sheet metal. Marginally-flanged inserts welded or otherwise assembled to the fitting have also been tried in various forms but they have all, so far at least, proven to be both expensive and slow.

It has now been found in accordance with the teaching of the instant invention that these and other objectionable features of the prior art couplings when adapted for use with duct board can, in large measure, be eliminated by simple, yet unobvious, expedient of using the selfsame marginally-flanged fitting designed for sheet metal ducting but using it in combination with a novel three-sided frame having wide inwardly opening channels sized to receive edges of the duct board bordering the rectangular opening therein and much narrower inwardly opening channels adapted to slidably receive the outturned fitting flanges. It has also been found that an entirely different method of making the connection must be employed than that which is used with the same fitting when attaching same within a similar opening in a sheet metal duct. The resulting joint is equally as tight as the one produced in the sheet metal duct and just about as fast to assemble, it being necessary to first position the frame.

Accordingly, it is the principal object of the present invention to provide a novel and improved slip-joint coupling for joining square or rectangular-ended sheet metal fittings into correspondingly shaped openings in a duct board duct wall.

A second objective is the provision of a novel method of assembling the fitting and frame of the coupling within the opening in the duct.

Another objective is to provide an assembly of the type aforementioned which is specifically designed to use as an integral part thereof the prior art marginally-flanged square and rectangularly-ended sheet metal fittings originally made for sheet metal ducting.

Still another objective is the provision of a novel three-sided frame for use in rectangular duct board openings in combination with certain of the prior art sheet metal fittings.

An additional object is to provide a frame of the type aforementioned wherein the sideframe elements thereof are springable relative to the crosspiece connecting same so as to enable them to occupy a slightly convergent relation to one another which, upon being spread apart to receive the outturned side flanges of the fitting, will tend to spring back together thus producing a positive grip upon the latter.

Further objects of the invention are to provide a coupling that is reasonably air tight, secure, fast and easy to assemble, dependable, versatile, compact, simple to disassemble, readily adaptable to various sizes of both rectangular and square duct board openings and one that is decorative in appearance.

Other objects will be in part apparent and in part pointed out specifically hereinafter in connection with the description of the drawings that follows, and in which:

FIG. 1 is a fragmentary perspective view of the assembly as seen from a vantage point above and to the left side thereof, such assembly including the sheet metal fitting and the mounting frame therefor both shown assembled and mounted within a rectangular opening in a duct board wall;

FIG. 2 is a fragmentary section to an enlarged scale taken along line 2—2 of FIG. 1;

FIG. 3 is a fragmentary section to the same scale as FIG. 2 taken along line 3—3 of FIG. 1;

FIG. 4 is a perspective view to the same scale as FIGS. 2 and 3 showing the frame alone from a vantage point above and to the left of its inside face;

FIG. 5 is a fragmentary perspective view to the same scale as FIGS. 2, 3 and 4 showing the rectangular flange-bordered opening in the sheet metal fitting as seen from a vantage point above and to the left of the entryway thereto;

FIG. 6 is an exploded perspective view from the same vantage point as FIG. 1 and to the same scale showing the frame bent into a triangular configuration preparatory to inserting same into the duct board opening;

FIG. 7 is a perspective view like FIG. 6 except that the frame is shown partially within the duct board opening except for the righthand leg with its free end still outside;

FIG. 8 is a perspective view like FIGS. 7 and 8 but showing the frame wholly within the duct board opening and partially unfolded;

FIG. 9 is an exploded view like FIG. 6 showing the frame in place within the duct board opening and fully unfolded while the fitting is shown in position for assembly to the latter; and, FIG. 10 is a perspective view like FIGS. 6–9, inclusive, showing the complete assembly with portions of the sheet metal fitting having been broken away to reveal how the inturned flange of the latter is bent down over the uncovered fourth edge of the duct board opening.

Referring next to the drawings for a detailed description of the present invention and, initially, to FIGS. 1–5, inclusive, for this purpose, reference numeral 10 has been chosen to broadly designate the combination which includes the sheet metal fitting and frame therefor, both of which have been similarly designated by reference numerals 12 and 14 respectively. The duct board panel that has been generally indicated by reference numeral 16 comprises a glass mat 18 of substantial thickness to one face of which is glued or otherwise bonded a silvered paper backing 20 to produce a laminate. These duct boards are commercially available and no invention is predicated thereon per se.

Fitting 12 is, likewise, of standard design although its use in combination with the frame 14 is entirely different from the way in which such fittings are joined directly into a rectangular opening in the wall of a sheet metal duct. Accordingly, while the construction of fitting 12 is well known and forms no part of the present invention by itself, nevertheless, those features which are significant insofar as its use in combination with frame 14 will need to be described.

Fittings of the general type indicated by numeral 12 are fabricated from sheet metal and, as far as the present invention is concerned, they can all be considered as tubular in that they are employed to take air from within one duct, usually a large one, and transfer it to a second duct (not shown) for delivery to a remote location. As much, the fitting can be in the form of a 90° or 45° elbow, a collar ect., all of which are generally characterized in the trade as "take-off fittings." The concern here is with that particular class of "take-off fittings" having at least one end 22 of rectangular or square construction designed to mate with and receive air from a similarly-shaped opening 24 in the duct wall 16. The other end 26 of the fitting may be any shape or size, the particular one shown being cylindrical.

With brief reference to FIGS. 5 and 9, it will be observed that the box-like end 22 has a square or rectangular opening 28 therein matching the opening 24 in the duct wall with which it is to mate and register. Bordering this opening on the side margins are a pair of outturned integral flanges 30 extending the full length thereof that cooperate with a third outturned flange 32 across one end to define a set of three such flanges, whereas, across the other end or fourth margin extends an inturned integral flange 34. The riveted overlapped seam 36 of the fitting usually occurs along inturned flange 34 as shown.

Frame 14 is most clearly revealed in FIG. 4 and it will be seen to comprise in the particular form shown a single elongate sheet metal strip bent to form stacked channels, one of which 38 is wider than the other and faces in one direction while the narrower of the two 40 opens in the opposite direction. The wider channel 38 includes a pair of spaced substantially parallel side walls 42 and 44 interconnected along corresponding edges thereof by bottom wall 46 which is approximately equal in width to the thickness of the duct board panel. One of the side walls 44 of the larger of the two channels 38 is approximately twice as wide as the other so that it can be reversely bent back upon itself to produce flap 48 that cooperates therewith to define the narrower channel 40.

Now, the basic stacked or "piggy-backed" double channel member thus formed is first cut to a length corresponding to the combined length of three sides of the rectangular opening 24 in the duct board panel. Next, it is slit at two places to divide same into three sections preparatory to being bent into the generally U-shaped configuration shown in FIG. 4 thereby producing a frame sized to fit into the opening 24 of the duct board panel with the larger channel 38 opening outwardly, the narrower channels 40 opening inwardly on the exterior thereof and the walls 46 adapted to lie up snug against the three edges of the opening within which the frame is intended to fit and encase as shown.

Next, with reference to FIGS. 6–10, inclusive, the method of mounting the frame 14 within the duct board opening 24 and subsequently connecting the fitting 12 thereto will be set forth in detail. In order to get the frame into the opening it must first be bent into the triangular configuration shown in FIG. 6. Next, a corner of the frame is introduced into a corner of the opening as shown in FIG. 7. In order to do this, however, it is oftentimes necessary to spring the sideframe member remote from the corner thus inserted forwardly of the plane of the exterior face of the duct board panel, again as shown in FIG. 7 with reference to the righthand sideframe member. At this point it then becomes possible to reopen the frame elements adjacent the inserted corner to the point where the corresponding edges bordering the opening in the duct board are seated in the outwardly opening channels 38 thereof as represented in FIG. 8 with the arrows in the lower lefthand corner and near the top indicating the direction of movement of said frame elements. Once these corner-defining frame elements are in place as shown, it then becomes possible to return the remaining sideframe element to a position within the opening as indicated in FIG. 8 by the third arrow in the lower righthand corner. To complete the installation of the frame, it is only necessary to swing this righthand sideframe element out in the direction of the upper arrow in FIG. 9 until the adjacent edge of the duct board opening is received and encased in its outwardly-facing channel 38. As thus installed, the frame encases three sides of the duct board opening in the manner indicated in the upper portion of the exploded FIG. 9. At this point, of course, the fourth side of the duct board opening remains uncovered and the inwardly opening channels 40 of the frame members are all on the exterior face of the latter in essentially coplanar relation to one another. It is significant to note that having once bent the sideframe members into the convergent relation shown in FIGS. 6, 7 and 8 in order to introduce the frame into the duct board opening, they will naturally remain just slightly convergent when spread apart into the position shown in FIG. 9 instead of being precisely parallel or even slightly divergent due to the inherent springiness of the sheet metal at the corners. This convergency, while not absolutely essential, is desirable because it results in the sideframe elements of the frame exerting a gripping action upon the corresponding outturned webs of the fitting when the latter are seated within the inwardly opening channels 40 thereof.

Accordingly, because of this inherent residual spring action tending to return the sideframe elements of the frame to their convergent relation, they must be held apart in most instances while the fitting flanges 30 are introduced into the channels thereof. To accomplish the latter, the side flanges 30 of the fitting 12 are placed in longitudinally aligned coplanar relation with the inwardly opening channels 40 of the sideframe elements 42 of the frame adjacent the opening therebetween. Outturned flange 32 of the fitting will be so oriented relative to the frame as to comprise the leading edge that will enter the opening between the sideframe elements first. Obviously, this will place the inturned flange 34 on the trailing edge. While holding the sideframe elements 48 apart to the extent required if at all, the flanges 30 are introduced into the adjacent ends of their inwardly opening channels and then slid all the way to the end thereof until flange 32 enters and seats in channel 40 of the crossframe element as shown about to take place in FIG. 9. When this has been accomplished, the opening in end 22 of the fitting should be in complete register with the opening 24 in the duct board wall except for the fact that inturned flange 34 still projects part way out into the latter. The final step in the operation is to bend the inturned flange down over the uncovered edge of the duct board opening as shown by the arrow in FIG. 10. This flange both covers the edge to complete the air seal therearound and provides a lock fastening the frame and fitting together and to the duct. Obviously, bending the flange down will not accomplish the desired interlock between the frame and fitting in the absence of the duct board. To bend this flange down, the operator will ordinarily have to reach in through the opposite open end 26 of the fitting because access thereto will seldom be available from inside the duct. The resulting assembly is essentially air tight, mechanically secure, convenient and fast to join together.

What is claimed is:

1. In combination: a hollow sheet metal fitting terminating at one end in a rectangular opening bordered on both sides by outturned flanges, on one end by an outturned flange and on the other end by an inturned flange; and a generally U-shaped three-sided frame including a crosspiece and a pair of sideframe elements each of which is formed to provide an outwardly-facing channel and an inwardly-facing channel, said outwardly-facing channels being sized and located to cooperate with one another to receive the edges of a duct board panel bordering three sides of a rectangular opening therein matching the rectangular opening in the fitting, said inwardly-facing channels being sized and located to slidably receive the correspondingly positioned outturned flanges of the fitting upon movement of said outturned end flange of said fitting in the direction of the crosspiece of the frame with the sideframe elements in parallel relation, and said inturned end flange defining a lock effective to retain said fitting within the duct board panel opening when bent down along the unframed edge thereof.

2. The combination as set forth in claim 1 in which: the sideframe elements of the frame are bent inwardly toward one another into a normally convergent relation such that upon their being spread apart into parallel relation to receive the side flanges therebetween and then released said sideframe elements will grip said flanges with a spring action.

3. A frame for use within a rectangular opening in a sheet of duct board as a means for fastening a hollow sheet metal fitting therein of the type having a matching rectangular opening at one end bordered on three sides by outturned flanges and the fourth by an inturned flange, which comprises: two sideframe elements and a crosspiece cooperating with one another to define a generally U-shaped sheet metal structure corresponding to the three sides of the fitting from which the outturned flanges depend, said sideframe elements and crosspiece each being formed to provide an inwardly-facing channel sized and positioned to slidably receive the correspondingly located outturned flanges of the fitting and an outwardly-facing channel adapted to receive an edge of the duct board panel bordering the rectangular opening therein, and said sideframe elements and crosspiece cooperating to leave the fourth side of the duct board opening unframed to pass the outturned flange of the fitting paralleling the inturned flange.

4. The frame as set forth in claim 3 in which: the sideframe elements are bent inwardly toward one another so as to occupy a normally convergent relation.

5. The frame as set forth in claim 4 in which: the sideframe elements are springable relative to one another and to the crosspiece for movement into parallel relation so as to both receive and grip the side flanges of the fitting therebetween.

6. The method of installing within a rectangular opening in a duct board panel a hollow sheet metal fitting having a matching rectangular opening at one end bordered on three sides by outturned flanges and on the fourth side by an inturned flange which comprises the steps of: encasing the three edges of the duct board opening corresponding to the sides of the fitting having the outturned flanges in the outwardly opening channels of a generally U-shaped frame having both outwardly and inwardly opening channels stacked one atop the other while leaving the fourth edge unframed, passing the outturned flange of the fitting paralleling the inturned flange through the open end of the frame, sliding the outturned flanges of the fitting into the inwardly opening channels of the frame to a position where the rectangular openings in said fitting and the duct board register with one another, and bending the inturned flange of the fitting down over the fourth edge of the duct board opening to lock said fitting down over the fourth edge of the duct board opening to lock said fitting and frame therein.

7. The method as set forth in claim 6 which includes the additional steps of bending the sides of the frame into a convergent relation to one another preparatory to introducing same into the duct board opening and subsequently spreading said sides apart to receive the corresponding fitting flanges so that the sides of the frame exert a gripping action upon the sides of the fitting.

* * * * *